United States Patent [19]
Cavanaugh et al.

[11] Patent Number: 6,016,489
[45] Date of Patent: Jan. 18, 2000

[54] METHOD AND APPARATUS FOR CONSTRUCTING STABLE ITERATORS IN A SHARED DATA COLLECTION

[75] Inventors: Ken M. Cavanaugh, Montara; Christian J. Callsen, Redwood City, both of Calif.

[73] Assignee: Sun Microsystems, Inc., Palo Alto, Calif.

[21] Appl. No.: 08/993,205

[22] Filed: Dec. 18, 1997

[51] Int. Cl.[7] .................................................. G06F 17/30
[52] U.S. Cl. ................................ 707/8; 707/1; 707/103; 707/201; 707/206
[58] Field of Search .............................. 707/1, 103, 201, 707/206, 8

[56] References Cited

U.S. PATENT DOCUMENTS

| | | | |
|---|---|---|---|
| 4,823,310 | 4/1989 | Grand .......................................... | 707/8 |
| 5,263,160 | 11/1993 | Porter et al. ............................. | 395/600 |
| 5,758,342 | 5/1998 | Gregerson .................................. | 707/10 |
| 5,787,447 | 7/1998 | Smithline et al. ....................... | 707/206 |
| 5,790,848 | 8/1998 | Wlaschin ................................. | 395/617 |
| 5,835,906 | 11/1998 | Hagersten et al. .......................... | 707/8 |
| 5,873,116 | 2/1999 | Van Fleet ................................. | 711/147 |

OTHER PUBLICATIONS

OMG Security Specification Document Formal/Nov. 5, 1997, pp. 15–9 to 15–10; pp. 15–147 to 15–162 (Section 15–7); pp. 15–219 to 15–230 (appendix B–6 to B–9.3) OMG Website—www.omg.org.

The Orbix 2 Reference Guide, Release 2.0 Nov. 1995, pp. 197–209; The Orbix 2 Programming Guide, Release 2.0 Nov. 1995, pp. 143, pp. 189–196, pp. 303–304—Support@iona.com.

Evaluations, Orbix (IONA), pp. 1–2—http://www.c3.lanl.gov/village/dist–comp/section 2_5_2.html.

Orbix, Market–Leading Implementation of CORBA 2, pp. 1–3—http://www.blackwhite.com/products/orbix.html.

IONA Technologies, IONA Delivers Full Suite of Features for Orbix 2.1, pp. 1–2—http://www.iona.com/news/press-room/Orbix21Features.html.

Iona Technologies, Apr. 1994, Version 1.2.1 Release Notes, pp. 1–4—http://www.up.ac.za/hsn/docs/orbix/RelNotes12.txt.

IONA Technologies, Orbix C+++ Version(s) : All, p. 1—http://www–usa.iona.com/support/kb/Orbix_C++/articles/324.805.html.

IONA Technologies, Orbix C++ Version(s) : 2.x, p. 1—http://www–usa.iona.com/support/kb/Orbix_C++/articles/238.214.html.

IONA Technologies, Orbix C++ Version(s) : 2.x, pp. 1–2—http://www–usa.iona.com/support/kb/Orbix_C++/articles/239.540.html.

(List continued on next page.)

Primary Examiner—Thomas G. Black
Assistant Examiner—William Trinh
Attorney, Agent, or Firm—Kudirka & Jobse LLP

[57] ABSTRACT

In a distributed object system, a stable object iterator provides a list of all persistent objects within a collection of objects. A plurality of iterators are supported in another aspect of the invention. An iterator associates a label with each persistent object in a collection of stable objects. The label indicates whether the associated object was added to or deleted from the collection before or after the inception of an iterator. Multiple persistent iterators are supported by providing an indication of which iterators each persistent object is, or is not, "visible" to. Should an element of the persistent object collection be created after one or more iterators is created, that element is "invisible" to those iterators. Objects that exist when one or more iterators are created remain "visible" to those iterators, even if the object is deleted from the collection while those iterators still exist. The system maintains an indication of all extent iterators and of maximum and minimum iterator identifiers which respectively correspond to the most recently created and least recently created iterators.

33 Claims, 10 Drawing Sheets

OTHER PUBLICATIONS

IONA Technologies, Orbix C++ Versions(s) : All, pp. 1–2—http://www–usa.iona.com/support/kb/Orbix_C++/articles/351.196.html.

IONA Technologies, Orbix C++ Version(s) : All, pp. 1–2—http://www–usa.iona.com/support/kb/Orbix_C++/articles/352.291.html.

Silicon Graphics, "Iterators", http://www.rt.e–technik.tu–darmstadt.de/~mali/DOC/STL_doc/Iterators.html, pp. 1–3, May 20, 1999.

METHOD AND APPARATUS FOR CONSTRUCTING STABLE ITERATORS IN A SHARED DATA COLLECTION

CROSS REFERENCE TO RELATED APPLICATIONS

The following U.S. patent applications are related to the present application and are incorporated by reference herein in their entirety:

U.S. patent application Ser. No. 08/554,794 now U.S. Pat. No. 5,577,251, filed Nov. 7, 1995 as a continuation to U.S. patent application Ser. No. 07/995,863, filed Dec. 21, 1992 (now abandoned);

U.S. patent application Ser. No. 08/670,682, filed Jun. 26, 1996;

U.S. patent application Ser. No. 08/673,181, filed Jun. 26, 1996;

U.S. patent application Ser. No. 08/670,700, filed Jun. 26, 1996;

U.S. patent application Ser. No. 08/670,681, filed Jun. 26, 1996;

U.S. patent application Ser. No. 08/670,684, filed Jun. 26, 1996;

U.S. patent application Ser. No. 08/669,782, filed Jun. 26, 1996;

U.S. Patent Application entitled "Method and Apparatus for Deferred Throwing of Exceptions in C++", filed by Christian J. Callsen and Ken M. Cavanaugh, U.S. patent application Ser. No. 08/993,075;

U.S. Patent Application entitled "Method and Apparatus for Fast, Local CORBA Object References", filed by Christian J. Callsen and Ken M. Cavanaugh, U.S. patent application Ser. No. 08/993,800;

U.S. Patent Application entitled "Method and Apparatus for Efficient Representation of Variable Length Identifiers in a Distributed Object System", filed by Ken M. Cavanaugh, U.S. patent application Ser. No. 08/993,204 filed Dec. 18, 1997;

U.S. Patent Application entitled, "Method and Apparatus for Enforcing Locking Invariants in Multi-Threaded Systems", filed by Christian J. Callsen and Ken M. Cavanaugh, U.S. patent application Ser. No. 08/993,206 filed Dec. 18, 1997;

U.S. Patent Application entitled, "Filter Framework for Executing Code During Method Invocation", filed by Anita Jindal, Ken M. Cavanaugh, Sanjeev Krishnan and Rohit Garg, U.S. patent application Ser. No. 08/993,287 filed Dec. 18, 1997; and U.S. Patent Application entitled, "Marshaling And Unmarshaling Framework For Supporting Filters In A Distributed Object System", filed by Anita Jindal, Ken M. Cavanaugh and Sanjeev Krishnan, U.S. patent application Ser. No. 08/993,263 filed Dec. 18, 1997.

FIELD OF THE INVENTION

This invention relates to distributed object systems and, more particularly, to implementing stable iterators in a data store for a distributed object system.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features. As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and reused in many cases, thereby reducing the development effort.

As will be understood by those skilled in the art, objects in the context of object-oriented programming are software entities comprising data and methods or operations on that data. The methods of an object collectively form an interface for manipulating the data in the object. The objects exist only at program runtime and are created, or instantiated, from object "classes" which are actually written by the programmer. The class code written by a programmer can be "reused" by another programmer by instantiating objects from that code.

In order to further reduce the programming burden, distributed object systems have been developed in which methods in objects resident on a server can be executed or invoked remotely over a network from a client application. In this manner, the objects can be developed and maintained by a party different from the party that developed the client application. In such a system information is routed or streamed between the client and the server. This information includes requests from the client to invoke an object on the server and results and data from the method invocation returning from the server to the client. In addition, object-oriented programs often communicate by streaming objects from one program to another.

In such streaming operations, a stream writer organizes, or marshals, the information to form a serial data stream. The serial data stream is then sent to the server where a stream reader unmarshals, the serial data stream to reconstruct a copy of the original information. The stream reader must operate such that the unmarshaling exactly "undoes" the effect of the marshaling so that the original information can be reconstructed. Ordinarily, such an operation does not present a problem, but when the stream reader is not written by the same author as the stream writer there can be incompatibilities.

In order to standardize the marshaling and unmarshaling and data transfer process, an industry consortium called the Object Management Group (OMG) was formed whose mission is to define a set of interfaces for inter-operable software. Its first specification, the Common Object Request Broker Architecture (CORBA) specification, is an industry consensus standard that hides all differences between programming languages, operating systems, and object location. The CORBA standard defines an object request broker (ORB) that handles the marshaling, transport and unmarshaling of information between applications. The ORB functions as a communication infrastructure, transparently relaying object requests across distributed heterogeneous computing environments. Inter-operability is accomplished through well-defined object interface specifications which allow client applications to connect to the ORB. CORBA provides an implementation independent notation for defining interfaces called the OMG Interface Definition Language (IDL).

The OMG CORBA specification defines an implementation independent object model which is actually built with a programming language, such as C++ or Java. In this model CORBA objects (also called "servants"), which are implemented by servers, have references that can be exported to clients. Clients and servers are roles, not mutually exclusive tasks for a single program, so that any one program can be both a client and a server. Objects and object references are typically different programming language objects, although they do not have to be.

Objects may be transient or persistent; a transient object is one for which there is no continuity of state from one process to another. An object's state generally refers to that portion of an object that is not executable code. A transient object is always launched in a state defined by a set of initialization parameters, it is bound to a single process, and its address may not change. In contrast, a persistent object is not bound to a single process, its address may change over time, and there is a continuity of state from one process to another for a persistent object, that is, its state is not defined by a set of initialization parameters at its launching. A transient object may be transformed into a persistent object by persistently storing and retrieving the current version of the object's state so that, upon launching, the object's state will reflect its most recent operations and will not require re-initialization. Persistent objects, therefore, relieve programmers from the onerous task of updating every attribute of every object every time an object is launched.

In one approach to providing persistent objects, a programming language extension provides an interface to the functionality of a database for storing an object's persistent attributes. However, such databases are typically relational databases and relational databases can be a rather awkward mechanism for storing data in the format typically employed for the description of an object's state. Although object oriented databases are available, the objects typically created by object oriented databases are not CORBA objects and so cannot take advantage of the functionality and services provided by the CORBA guidelines.

An approach to storing object data in a distributed object network that is compatible with CORBA guidelines is disclosed in a copending patent application filed on Jul 1, 1996, having Ser. No. 08/677,013 and entitled, "Method and Apparatus For Storing Persistent Object Data On A Distributed Object Network Using A Marshaling Framework", by Ken M. Cavanaugh III, the inventor of the present invention, et al, which is assigned to the same assignee as the present invention and is hereby incorporated by reference in its entirety. That application sets forth means and methods for the persistent storage of an object's state and an index, or dictionary. The combination of stored object states and index constitute an indexed collection of elements, each element of which includes an object's state, which yields a collection of persistent objects.

With an indexed collection such as this, many applications would benefit greatly from a mechanism for listing all the elements in the collection. Such mechanisms are often referred to as iterators. The creation of persistent iterators poses particularly daunting obstacles, especially in multi-threaded distributed object systems. For example, if one thread reads through the elements in a collection and performs some computation on the elements and another thread concurrently deletes elements of the collection, the iterator associated with the first thread could miss some elements of the collection deleted by the second thread. One approach to the implementation of an iterator in a mult-threaded system is to force all other threads that need to access the elements in a collection to wait on a lock while one thread is iterating over the collection. While this approach ensures that elements will not be inadvertently "hidden" from iterators, it exacts high performance penalties. The iterator may require an extremely long time to complete, especially if it is used by a remote application.

A stable iterator, that is, an iterator which always returns to the same set of objects in the same order as existed at the time the iterator was created, regardless of subsequent creation and deletion of objects in the collection by other threads during operation of the iterator, would therefore be highly desirable. The concurrent support of a plurality of stable iterators would be particularly advantageous for a shared data system, such as a distributed object system.

SUMMARY OF THE INVENTION

In accordance with the principles of the invention, a label is associated with each persistent object, or element, in a collection of persistent objects. This label indicates whether the associated element was added to or deleted from the collection before or after the creation of an iterator. Therefore, during operation, the iterator can determine which element references should be returned.

In another aspect of the invention, the system supports multiple persistent iterators by providing an indication of the iterators to which each persistent element is, or is not, "visible". For example, when an element of the persistent element collection is created after one or more iterators is created, that element is "invisible" to those iterators. The system also includes an indication that the associated element was marked for deletion. Elements that are in existence when one or more iterators are created remain "visible" to those iterators, even if the element is marked for deletion. Elements can actually be deleted from the collection when they are no longer visible to any un-destroyed iterator.

In the presently-preferred embodiment, the previously-described element label provides an indication of whether an element is visible to an iterator or not. To this end, each iterator is assigned a unique monotonically increasing identifier (ID) value. The element label includes a range of iterator ID values and a "deleted" flag which indicates whether the element associated with the label has been marked for deletion. The range of iterator ID values and element deleted flag are used by an iterator to determine whether the associated element is visible to the iterator or not. If the deleted flag has the value "True", the element is visible to those iterators that fall within the range of iterator ID values. If the iterator deleted flag has the value "False", the element is visible to those iterators that fall outside the range of iterator ID values. Elements added to the collection before any iterators exist are only given a label at such time as they may be marked for deletion, at which point, their element label would include a deleted flag with the value True and a range of iterator ID values for which the element is visible, that is, all iterators that exist at the time the element is deleted.

In another aspect of the presently preferred embodiment of the invention, the system maintains an indication of all extent iterators, and maximum and minimum iterator identifiers which respectively correspond to the most recently created and least recently created valid iterators.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
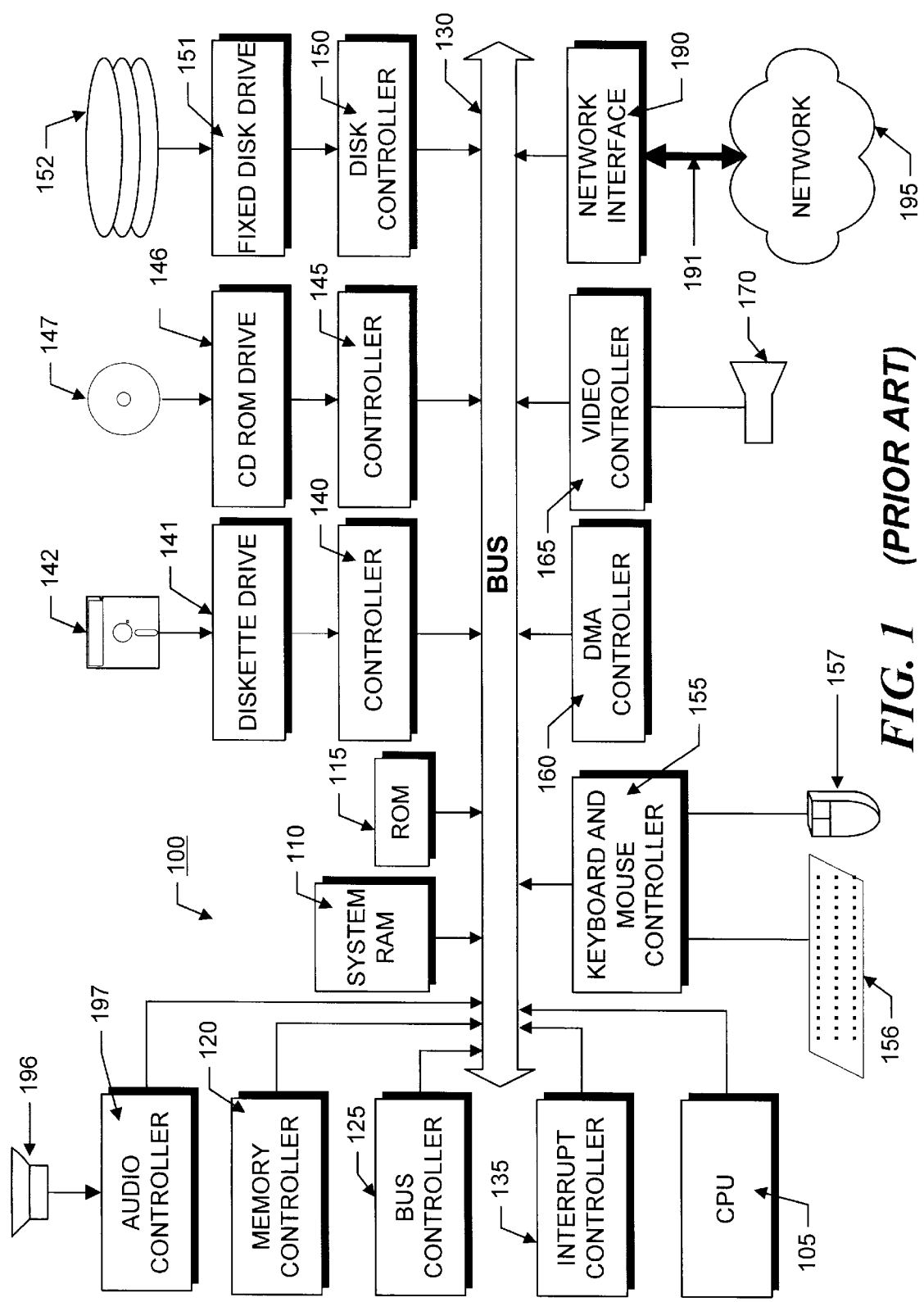
FIG. 1 is a schematic block diagram of a prior art hardware platform which forms part of a computer system on which the invention can be run.

FIG. 1 illustrates the system architecture for an exemplary client computer 100, such as an IBM THINKPAD 701® computer or Digital Equipment Corporation HiNote™ computer, on which the disclosed network access system (system) can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices.

For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

Client computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 2:
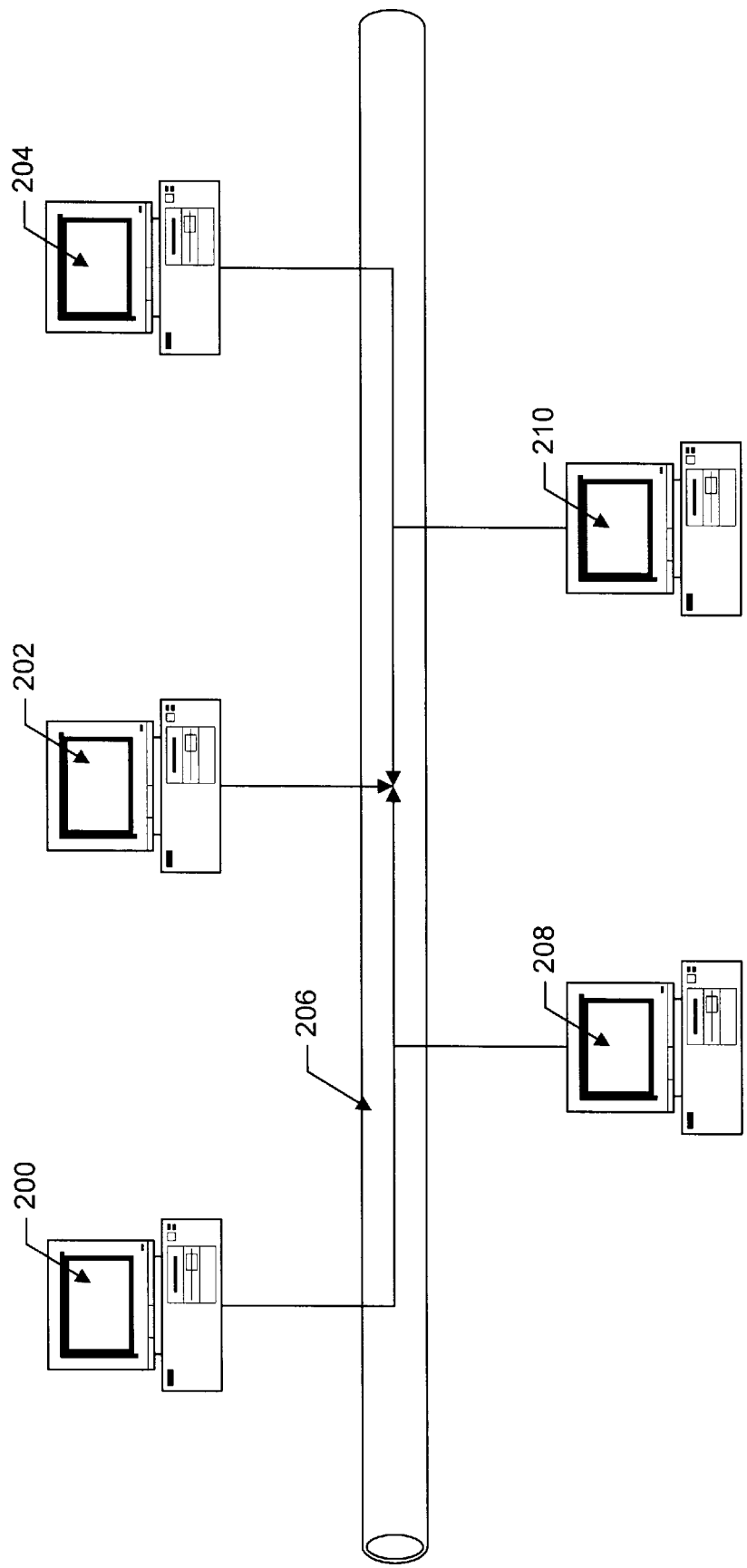
FIG. 2 is a schematic diagram of a prior art computer network system on which a CORBA system can be built.

FIG. 2 illustrates, in a very simple fashion, the connection of a number of computing systems, such as that shown in FIG. 1, to form a distributed computing facility. Each of the individual stations 200, 202, 204, 208 and 210 are interconnected by a network mechanism. Although the distributing computing facility could exist on a single computing system, it is more likely to operate over a network transport medium. Such a transport medium may be LAN as shown in FIG. 2, but may also be other network arrangements, including the Internet. All that is necessary is that the terminals 200, 202, 204, 208 and 210 be able to communicate with each other using predefined protocols to exchange information. As previously mentioned, the CORBA architecture overlays such a network and relieves the individual applications from dealing with the details of transporting information over the network. More particularly, the CORBA architecture hides all of the details and the actual network protocols from the application programs. It assures that the application programs operate with each other regardless of the platforms on which the software is designed to run and regardless of the network protocols used to interconnect separate computing systems.

Figure 3:
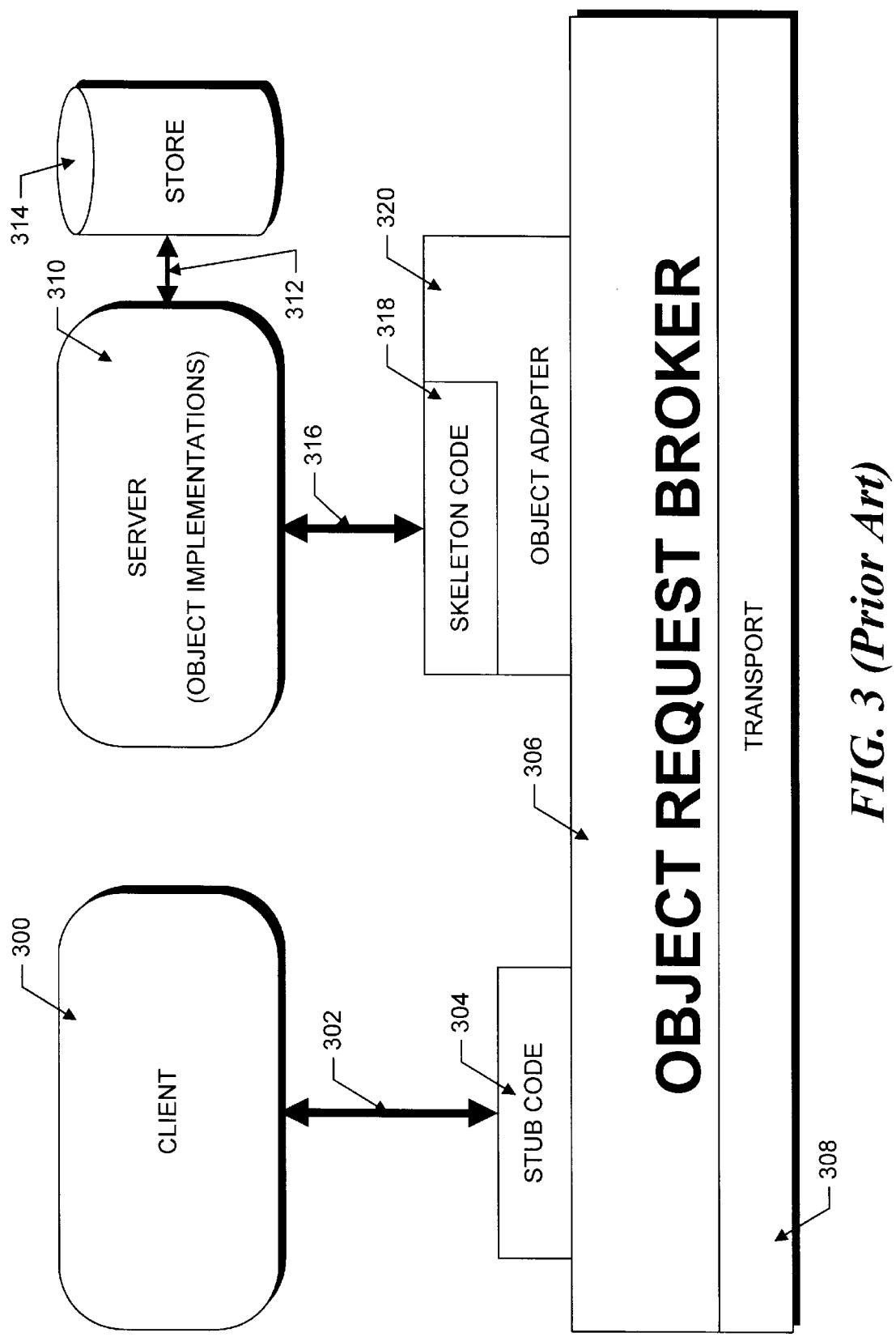
FIG. 3 is a block schematic diagram illustrating a prior art CORBA environment and showing the relationship of the client, ORB, object adapter and server.

FIG. 3 illustrates, in a very schematic form, the basic CORBA architecture which defines a peer-to-peer distributed computing facility where all applications are objects (in the sense of object orientation). Objects can alternate between client roles 300 and server roles 310. An object operates in a client role 300 when it is the originator of an object invocation. An object operates in a server role 310, called an object implementation, when it is the recipient of an object invocation.

The client 300 communicates with the server 310 by means of an object request broker or ORB 306. The ORB 306 operates with a transport 308 that conveys information between the client 300 and server 310 and, as previously mentioned, the ORB 306 handles the marshaling, transport and unmarshaling of information between client 300 and server 310. The client 300 communicates with the ORB 306, as indicated schematically by arrow 302, by means of an implementation independent syntax which describes object encapsulations. This syntax is called an interface definition language (IDL) and is defined in the CORBA specification generated by OMG. The OMG interface definition language can be used to define interfaces that have attributes and operation signatures. The language also supports inheritance between interface descriptions in order to facilitate reuse by developers. Objects or servants in the server 310 export object references with interfaces specified by the OMG IDL for use by clients. The object reference contains an identification of the object implementation so that the server 310 can pass a request to the correct object. The server 310 communicates with a data store, as indicated by an arrow 312, to store and retrieve data, including persistent object data.

The entire CORBA architecture is actually implemented in a conventional programming language, such as C, C++, or Smalltalk. Implementations in a variety of languages are available from a number of vendors who typically provide a compiler bundled with their ORB products. The compilers generate header files which define the OMG IDL interfaces and can be incorporated into application programs. The compilers also generate stub code 304 and skeleton code 318 for each interface.

The client application program 300 can directly link directly to the OMG IDL stub code 304. As far as the client application program is concerned, an invocation of the stub code 304 appears to be a local function call. Once invoked, the stub code 304 provides an interface to the ORB 306 that performs marshaling to encode and decode the operation's parameters into communication formats suitable for transmission on the transport 308 to the server 310.

At the server side, the OMG IDL skeleton code 318 is the corresponding implementation of the OMG IDL interface. When the ORB 306 receives a request, the skeleton code 318 unmarshals the request parameters and generates a call, indicated schematically by arrow 316, to an object implementation in the server 310. When the server completes processing of the request, the skeleton code 318 and stub code 304 return the results to the client program 300. If an error has occurred, exception information generated by the server or by the ORB is returned.

An object adapter 320 comprises the interface between the ORB 306, the skeleton code 318 and the server 310. Object adapters, such as adapter 320, support functions, such as registration of object implementations and activation of servers. There are many potential types of object adapters, depending on the purpose of the adapter. The original CORBA specification defined only a general-purpose Basic Object Adapter or BOA. The BOA performs some basic functions. For example, when a client request specifies an inactive server process, the BOA automatically activates the server process. When the server is activated it registers its implementation with the BOA. The BOA then stores this registration to use in future object requests. After an object is activated, it can receive client requests by means of a callback method in the skeleton code 318. BOA services also include exception handling and object reference management.

Figure 4:
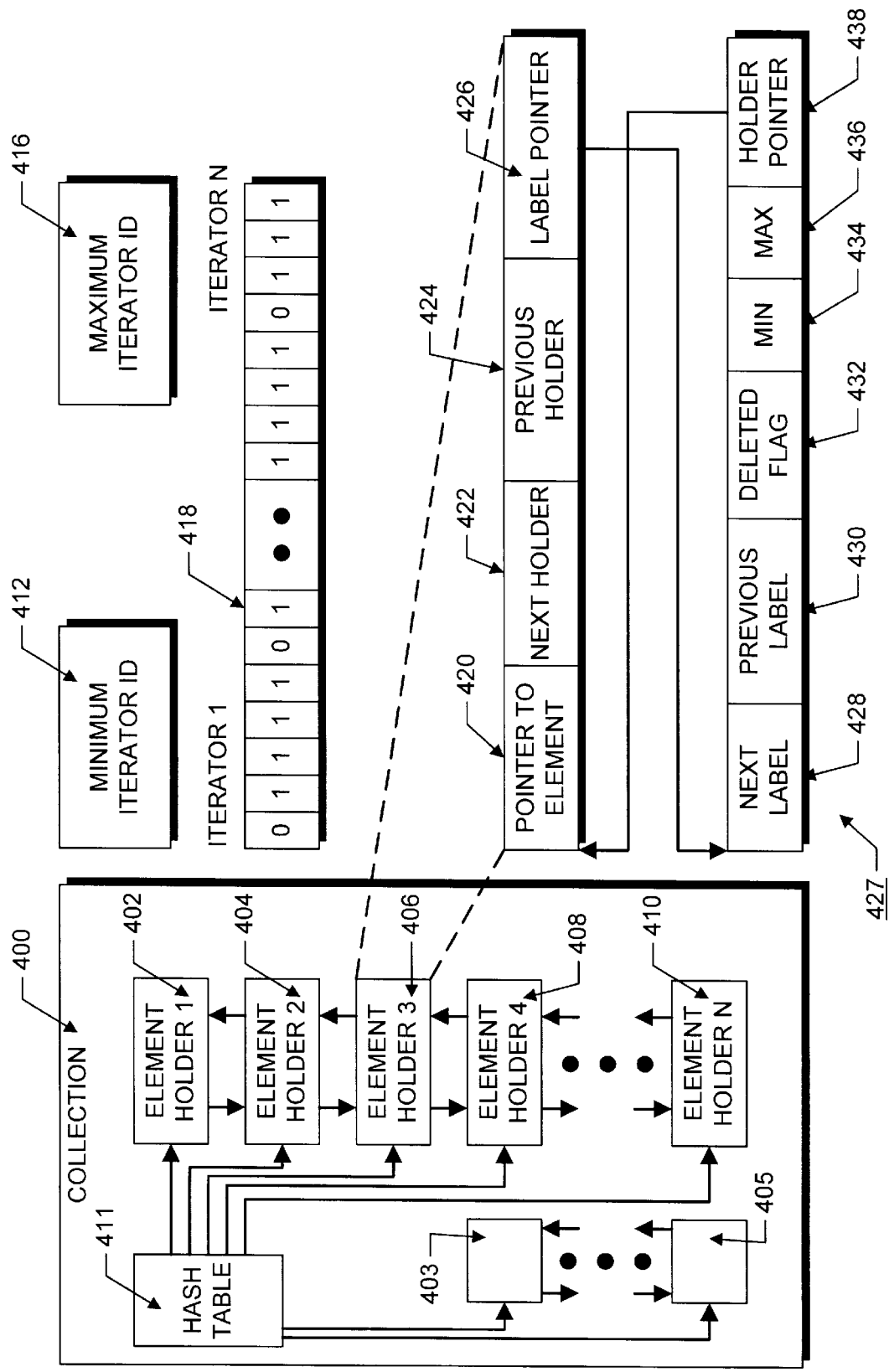
FIG. 4 is a block diagram which illustrates various data structures, including collection elements, element labels, iterator identifications, and an iterator bit vector used to construct a stable iterator in accordance with the principles of the present invention.

FIG. 4 is a block diagram which illustrates a collection of elements and the basic components of a stable iterator system constructed in accordance with the principles of the invention. A collection of elements 400, which the iterator operates on, may include several objects in a distributed object system. Each of the collection's elements are contained in a element holders, such as element holder 1 (402), element holder 2 (404), element holder 3 (406), element holder 4 (408) to element holder N (410). Element holders, such as element holder 1 402, are formed into a doubly-linked list by pointers to previous and next element holders as illustrated by the vertical arrows in collection 400. There are multiple element holder lists, as illustrated by the doubly linked-list including element holders 403 and 405. Each of the element holder lists corresponds to elements that hash to the same value in the hash table 411. Each element holder list has a separate reference in the hash table 411, and the hash table 411 also has a reference to the list of element labels which is described below. The hash table can be used to quickly locate an element. Illustratively, the collection 400 might be a persistent mechanism such as an index, or dictionary, which allows an object be looked up based on a key value, such as a name, associated with the object.

Each element holder, for example, element holder 406, contains a number of fields 420–426. Field 420 is a pointer to the actual element, field 422 is a pointer to the next element holder in the aforementioned element holder doubly-linked list structure, field 424 is a pointer to the previous element in the doubly-linked list structure, and field 426 is a pointer to a label.

To ensure that the iterator operates on all the elements held within the collection 400 at the time of the iterator's inception, but not upon any elements that may have been created subsequently, each iterator is assigned a unique ID. The iterator IDs may, for example, be a number assigned to each iterator. When a new iterator is created, the last assigned number is incremented to form the new iterator ID number. Therefore, the iterator IDs form a monotonically increasing numerical sequence.

Each element holder 406 may have a label 427 associated with it that indicates a range of iterator IDs for which the element should be visible. The labels are also arranged in a doubly-linked list which is reachable from the hash table 411. Each label 427 includes a pointer 428 to the next label in the label linked list, a pointer 430 to the previous label in the label linked-list, a "deleted" flag 432 which is used to mark the associated element as deleted, a minimum iterator ID field 434, a maximum iterator ID field 436 and a pointer 438 back to the element holder with which it is associated.

Minimum iterator ID field 434 and maximum iterator ID field 436 each hold an iterator ID and indicate, for the label 427 and its associated element 406, earlier formed and later formed iterators, respectively. The deleted flag 432 holds a boolean value which indicates whether the associated element has been marked for deletion, and the pointers 428 and 430 effect the linking of the label list.

The range of iterator ID values delineated by the minimum iterator ID field 434 and the maximum iterator ID field 436 is used in conjunction with the deleted flag 432 to determine whether an element associated with the label is visible to a given iterator in the following manner. If the deleted flag 432 has the value "True", the element is visible to those iterators that fall within the range of iterator ID values between the value stored in the minimum iterator ID field 434 and the maximum iterator ID field 436, inclusive. If the iterator deleted flag 432 has the value "False", the element is visible to those iterators that fall outside the range of iterator ID values between the minimum iterator ID value 434 and the maximum iterator ID value 436, inclusive, or, equivalently, the element is not visible to those iterators which fall within the range. Elements added to the collection before any iterators exist are only given a label at such time as they are deleted. In that case, the element's label would include a deleted flag with the value "True" and a range of iterator ID values for which the element is visible, that is, for all iterators extant at the time the element is deleted.

The values stored in minimum iterator ID variable 412 and maximum iterator ID variable 416 respectively correspond to the iterator IDs for first, and most recently created active, or valid, iterators maintained by the system. The existing or deleted state of each iterator ID is represented as a bit vector 418. Vector 418 includes a bit corresponding to each iterator ID which has been created in the system with the iterator ID corresponding to the bit position. A logic "1" in a particular bit position indicates that an iterator with that iterator ID is "valid", that is, that the corresponding iterator has not been deleted. A "zero" indicates that the iterator with the Id corresponding to the bit position has been destroyed. As iterators are added, the maximum valid iterator ID variable 416 is incremented and the next available bit location within the vector 418 is set equal to one. The iterator bit vector 418 may, for example, comprises a plurality of concatenated words in which the bit position is equivalent to the iterator ID. As an iterator is deleted, the associated bit location within the bit vector 418 is set equal to a logic "0" and, if the iterator occupies the lowest valid iterator ID position, the minimum valid iterator ID variable 412 is updated to the new minimum iterator ID in the set 418.

In operation, if no iterator exists when an element in the collection 400 is created, no label is immediately associated with the element. The element will not be labeled until it is deleted, at which point its label will include the minimum and maximum iterator IDs at the time of its elimination, and its deleted flag will be set to "True". An element with no label is visible to all iterators.

If iterators exist when an element in the collection 400 is created, an element label is created and the element label includes the range of iterator IDs at the time of the element's creation and its deleted flag is set "False". With its deleted flag set to "False", an element is visible to all iterators outside the range delineated by the element's minimum and maximum iterator IDs.

When an element is deleted, the element should remain visible to all iterators that were created after the element's creation and which still exist at the time of the element's elimination. To this end, if the element was created after one or more iterators existed, and is therefore labeled, the deleted flag in the element's associated label is set to be "true", and the minimum and maximum iterator IDs are updated, with the maximum iterator ID taking on the value of the current maximum iterator ID and the minimum iterator ID taking on the iterator ID value following that of the element's former maximum iterator ID. However, the element, itself, is not deleted at this time.

In a currently preferred embodiment of the invention, the element labels are stored persistently, although the iterators are not themselves persistent objects. A label remains when a server is shut down. "Stale" labels, that is, labels left over after a server is shut down, are removed preferably when the collection 400, is initialized as part of a service start-up process. Removal of stale labels is accomplished using the label list stored in the hash table 411.

Figure 5:
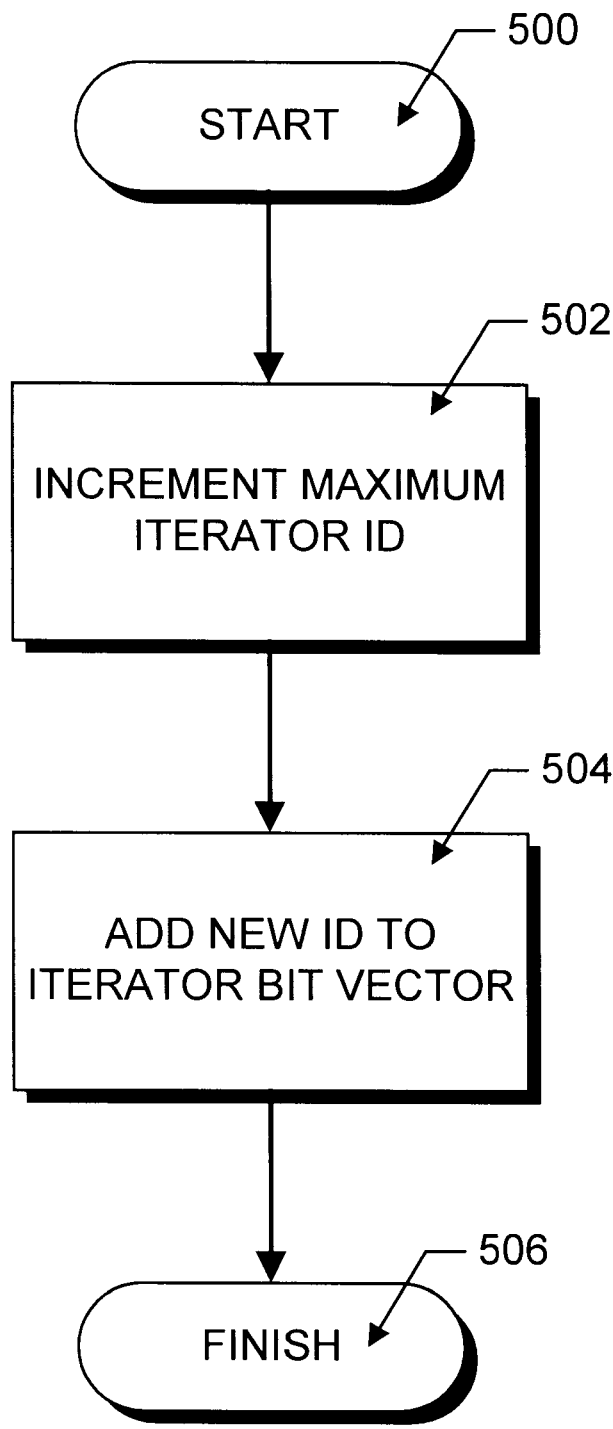
FIG. 5 is a flow diagram which illustrates the process of adding an iterator ID to a distributed object system in accordance with the principles of the present invention.

The process of creating an iterator is set forth in the flow diagram of FIG. 5, which begins at step 500 and proceeds to step 502, where the maximum iterator ID 412 is incremented. The process then proceeds to the step 504, where a new iterator ID is added to the iterator bit vector 418, that is, the next sequential bit location is set to a logic "1". From step 504, the process proceeds to the finish at step 506.

Figure 6A:
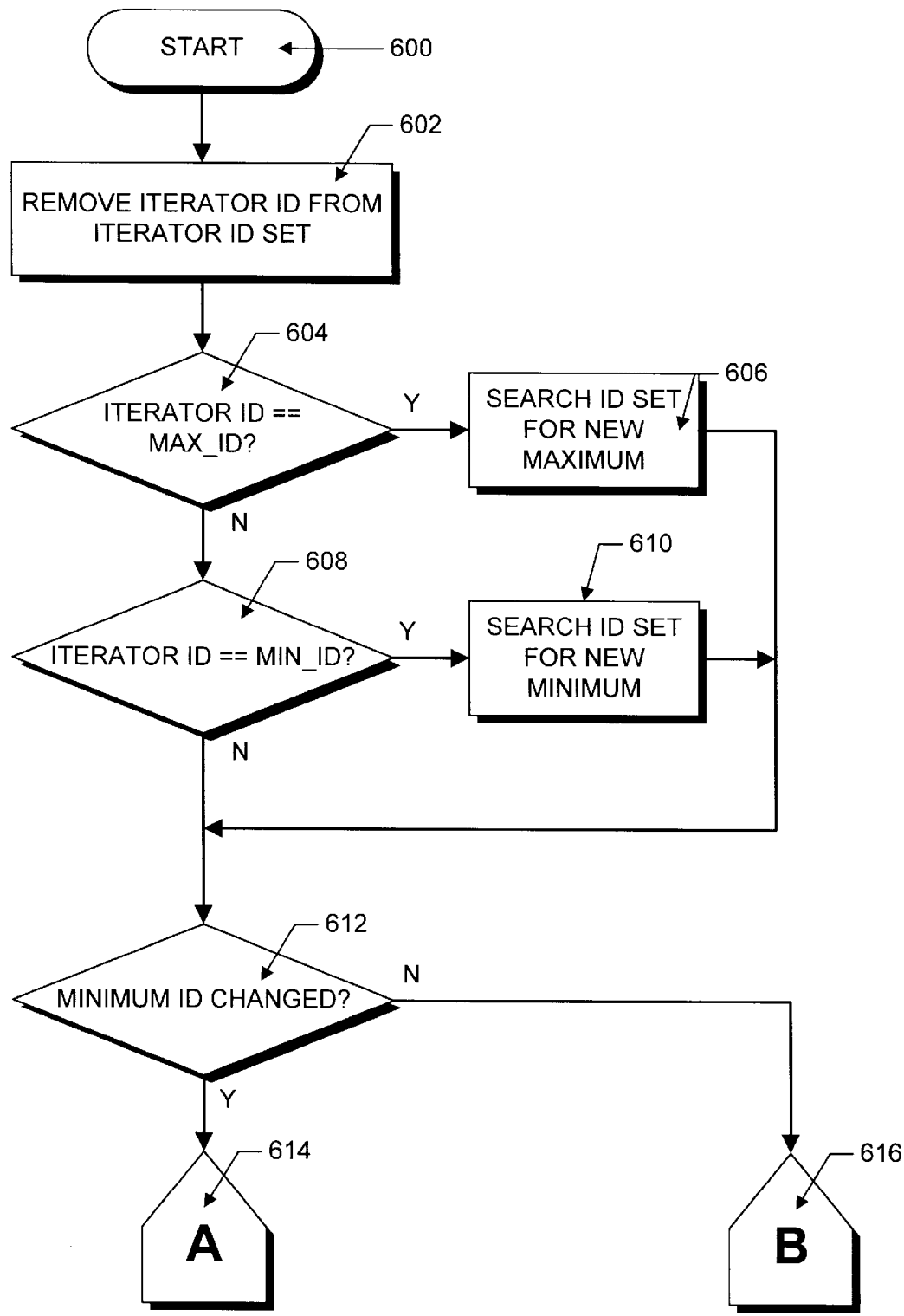
FIGS. 6A and 6B together constitute a flow diagram which illustrates the process of deleting an iterator ID from a distributed object system.
Figure 6B:
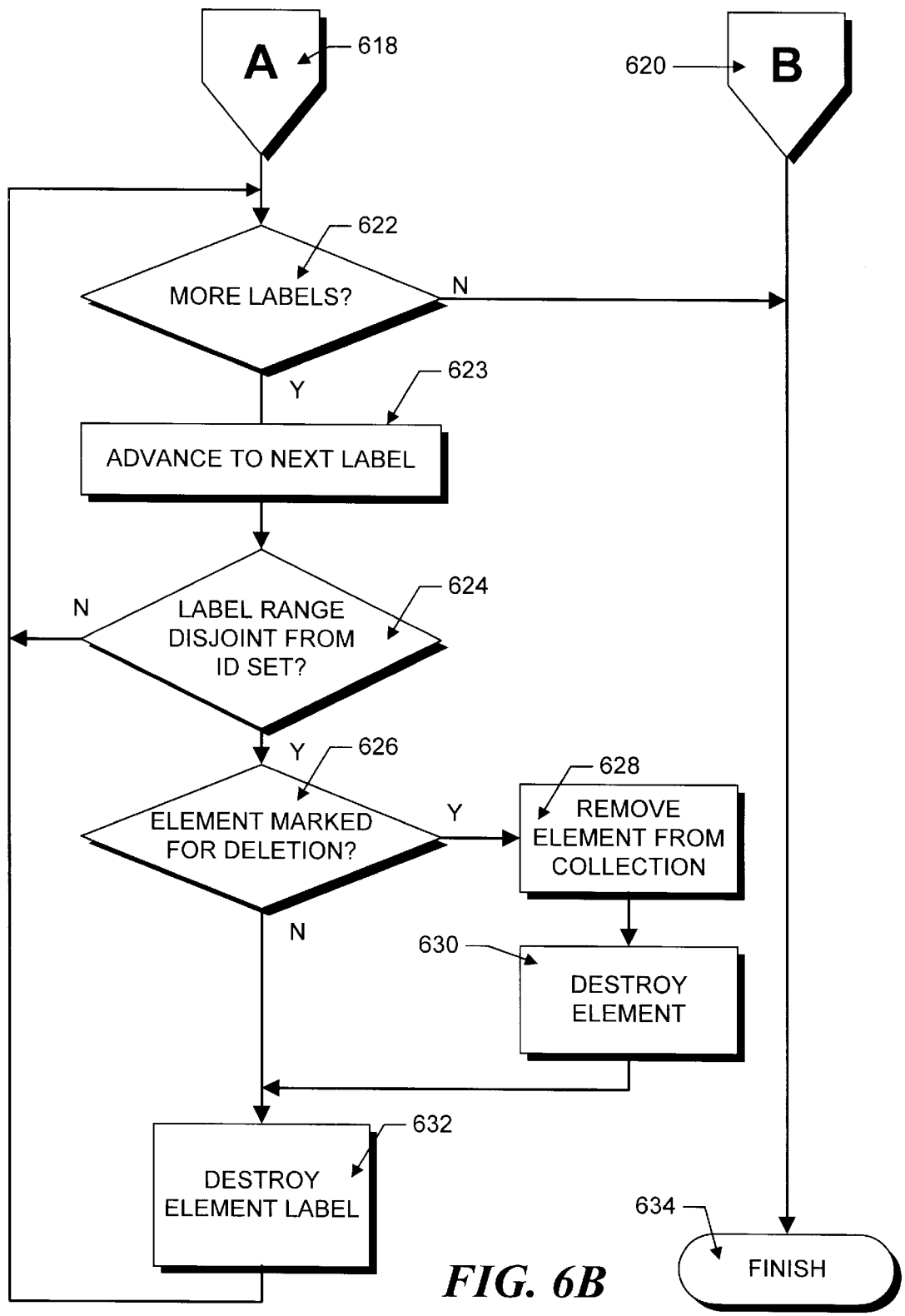

The process of destroying an iterator is set forth in FIGS. 6A and 6B which, together, compose a single flow diagram. The process starts at step 600, and proceeds to step 602, where the ID associated with the iterator that is to be deleted is removed from the iterator ID set represented by vector 418. In the presently preferred embodiment, this is accomplished by setting the bit within vector 418 associated with the iterator's ID equal to a logic "0".

The process then proceeds to step 604, where it is determined whether the iterator being deleted has an iterator ID equal to the maximum iterator ID in variable 416. If the iterator being deleted is associated with the maximum iterator ID, the process proceeds to step 606, where the iterator ID set 418 is searched to determine a new maximum iterator ID. This is accomplished by searching the iterator ID bit vector 418 for the highest bit position containing a logic "1". The new maximum ID is the corresponding bit position. The maximum iterator ID 416 is then updated to reflect the new maximum valid iterator and the process then proceeds from step 606 to step 612, which will be discussed momentarily.

If, in step 604, it is determined that the iterator being deleted does not have the maximum iterator ID 416, the process proceeds to step 608, where it is determined whether the iterator being destroyed has an iterator ID equal to the minimum iterator ID value stored in variable 412. If the iterator being destroyed is associated with the minimum iterator ID 412, the process proceeds to step 610, where the iterator ID set 418 is searched to determine a new minimum iterator ID by searching for the lowest bit position within the bit vector 418 containing a logic "1". The value of that location is copied into the minimum iterator ID variable 412. From step 610, the process proceeds to step 612, as it does if, in step 608, it is determined that the iterator being deleted is not the minimum iterator.

In step 612, it is determined whether the minimum iterator was changed and, if it was not, the process proceeds, via off-page connectors 616 and 620, to finish in step 634. If on, the other hand, if it is determined in step 612 that the minimum iterator has been deleted, the process proceeds, via off-page connectors 614 and 618, to step 622, where all the element labels are processed.

If there are no more unprocessed labels to be processed, as determined in step 622, the routine proceeds to finish in step 634. If there are more labels, the routine proceeds to step 623 where it advances to the next label (using the "next" pointer 428) and, from there, to step 624, where it is determined whether the range delineated by the label's minimum iterator ID 434 and maximum iterator ID 436 is disjoint from the iterator ID set 418. In this context, "disjoint" means that iterator ID of the iterator being destroyed, although the minimum valid iterator, is the highest iterator ID within the label iterator range as determined by the minimum value 434 and the maximum value 436, and, after the destruction of the iterator, no remaining iterators have IDs within the range determined by the minimum value 434 and the maximum value 436. If not, the process proceeds back to step 622 to continue processing labels.

If, in step 624, it is determined that the range delineated by the label's minimum 434 and maximum iterator ID 436 is disjoint from the iterator ID set 418, the process proceeds to step 626, where it is determined whether the associated element was marked deleted as indicated by the deleted flag 432. If the element was marked deleted, the process proceeds to step 628, where the element is removed from the collection and from there to step 620, where the element is destroyed. From step 630, the process proceeds to step 632 where the element label 427 is destroyed.

If, in step 626, it is determined that the element was not marked deleted, the process proceeds to step 632 where the element label 427 is destroyed. Following step 632, the process proceeds to step 622 to check and process any additional labels, as previously described.

Figure 7:
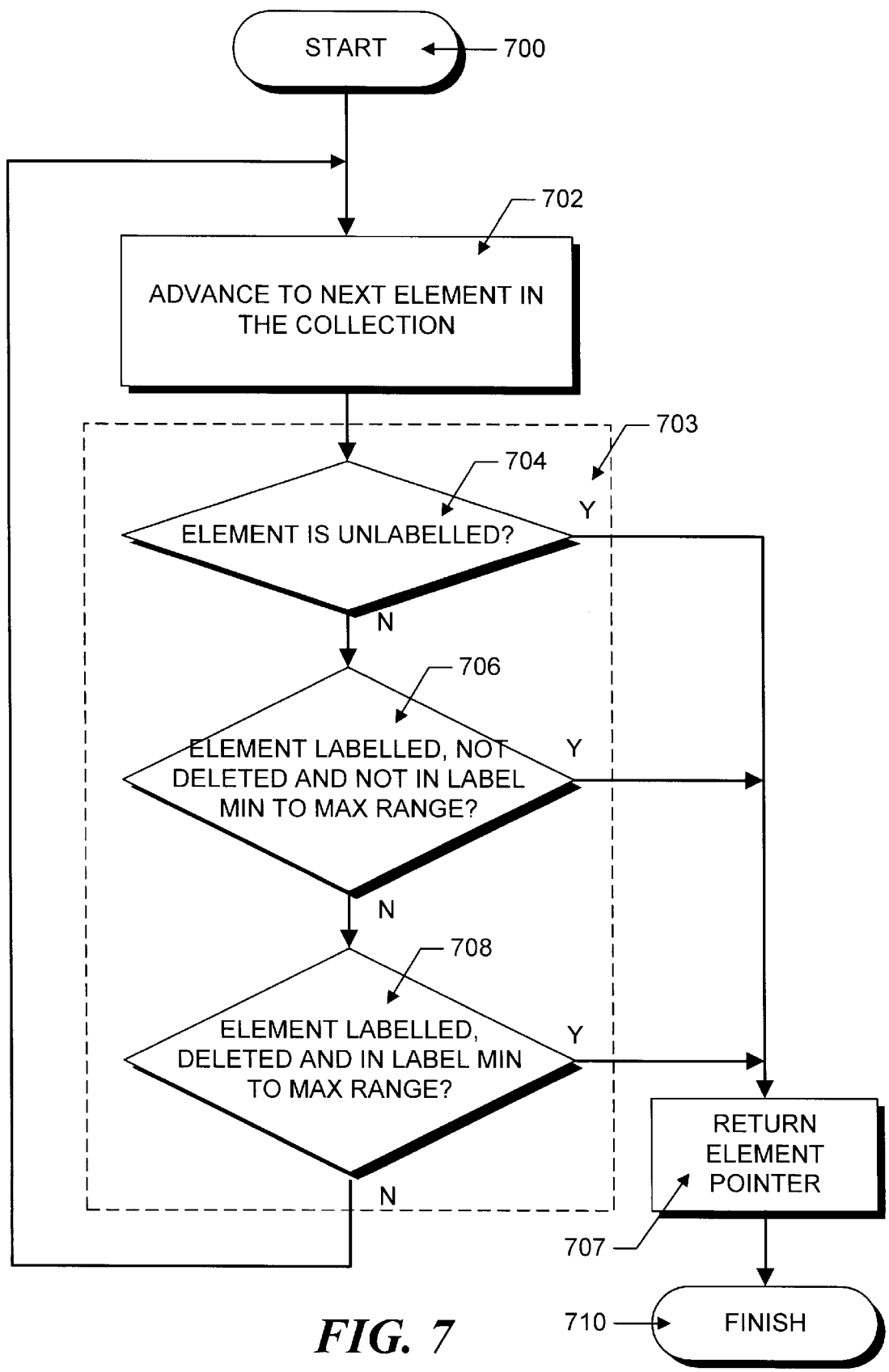
FIG. 7 is a flow diagram which illustrates the operation of a persistent iterator in selecting the next item in a collection of items in accordance with the principles of the present invention.

Use of an iterator, specifically, the retrieval of the next visible element within a collection, is illustrated by the flow diagram of FIG. 7. Such a process may be used, for example to implement the next( ) method commonly found in iterators. The process begins at step 700, and proceeds to step 702. In step 702, the iterator advances to the next element in the collection 400. The process then proceeds to steps 704, 706 and 708, where it is determined whether the element is visible to the iterator. These steps, delineated by box 703, constitute a routine which makes a visibility determination. They could be used in conjunction with steps 702 and 707 to form a routine which returns a reference to the "next" element in the collection. Alternatively, they could be used to return a boolean visible/not visible flag to an existing iterator routine.

From step 702, the process proceeds to step 704, where it is determined whether the element is unlabeled. If the element is unlabeled, the element was created before the inception of any iterator, has not been deleted, and is visible to all iterators. In this case, the iterator has located a visible element and the process proceeds to step 707 where it returns a pointer to the element and, from there, to finish at step 710.

On the other hand, if the element is labeled, the process proceeds from step 704 to step 706, where it is determined whether the element is not marked deleted and whether the iterator is not within the element's labeled minimum to maximum iterator ID range. If the element is labeled, not marked deleted, and the current iterator's ID is not within the label's minimum to maximum iterator ID range, the element is visible to this iterator, and the process proceeds to step 707, where it returns an element pointer, and from there to step 710 finish.

If the element is labeled and either marked deleted or within the iterator minimum to maximum ID range, the process proceeds from step 706 to step 708, where it is determined whether the element is labeled, marked deleted, and the iterator is within the minimum to maximum iterator ID range. If so, the element is visible to this iterator and the process proceeds to step 707, where it returns a pointer, and, from there, proceeds to step 710 to finish.

If it is determined, in step 708, that the labeled element is either not marked deleted and the iterator is within the iterator minimum to maximum ID range or the element is marked deleted and the iterator is not within the iterator minimum to maximum ID range, the element was created after the iterator's inception or the iterator was created after the element was marked deleted and the element is therefore invisible to this iterator. Consequently, the process skips this element and proceeds to step 702 to advance to the next element and to determine whether the next element is visible to the iterator. Operation proceeds in this manner until a visible element is determined and a pointer returned. An iterator would typically proceed in this manner, returning a pointer to a visible element with each invocation of the next ( ) method, until the end of the collection is reached, at which point a null pointer would be returned to signal the end of the iteration.

Figure 8:
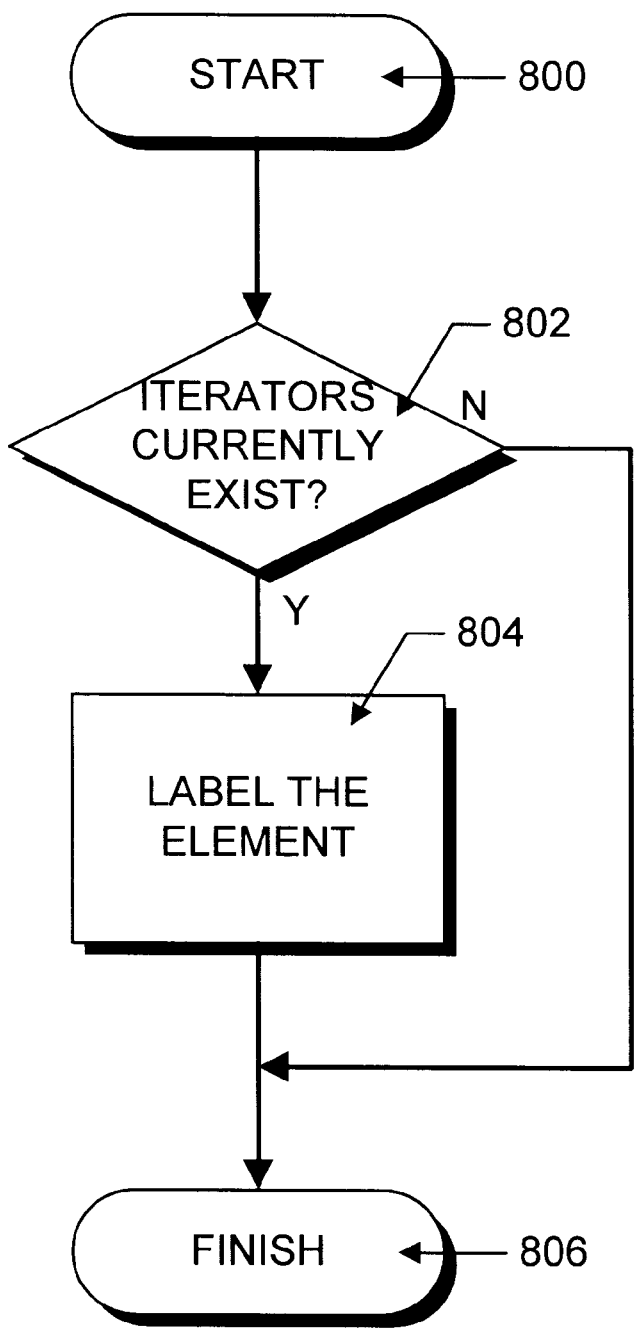
FIG. 8 is flow diagram which illustrates the process of labeling elements in a collection of persistent objects.

The process for creating an element in the collection of elements 400, in so far as it relates to iterators, is set forth in the flow diagram of FIG. 8, where the process begins at step 800 and proceeds to step 802. In step 802, it is determined whether iterators exist at the time the element is created. If no iterators exist at the time of the element's creation, the process proceeds to finish in step 806. On the other hand, if iterators do exist at the time of the element's creation, the process proceeds from step 802 to step 804, where an element label is created and associated with an element, so that the element is labeled. The element's label will include the minimum iterator ID 434 and maximum iterator ID 436, as they exist at the time of the element's creation. The element's deleted flag 432 will be set to have the value "False". After thus labeling the element in step 804, the process proceeds to step 806 where it finishes.

As an example of the element labeling process, suppose iterators 1,2,3, and 4 exist at the time an element "A" is created. The label associated with element "A" will include 1,4, and "False", for the minimum iterator ID, maximum iterator ID, and the deleted flag, respectively. An iterator, such as iterator 1, that was created before element A was created will detect the "False" status of the element's deleted flag, interpret the range 1–4 as the range of iterators for which element A is not visible and thereby determine that it "cannot see" element A.

Figure 9:
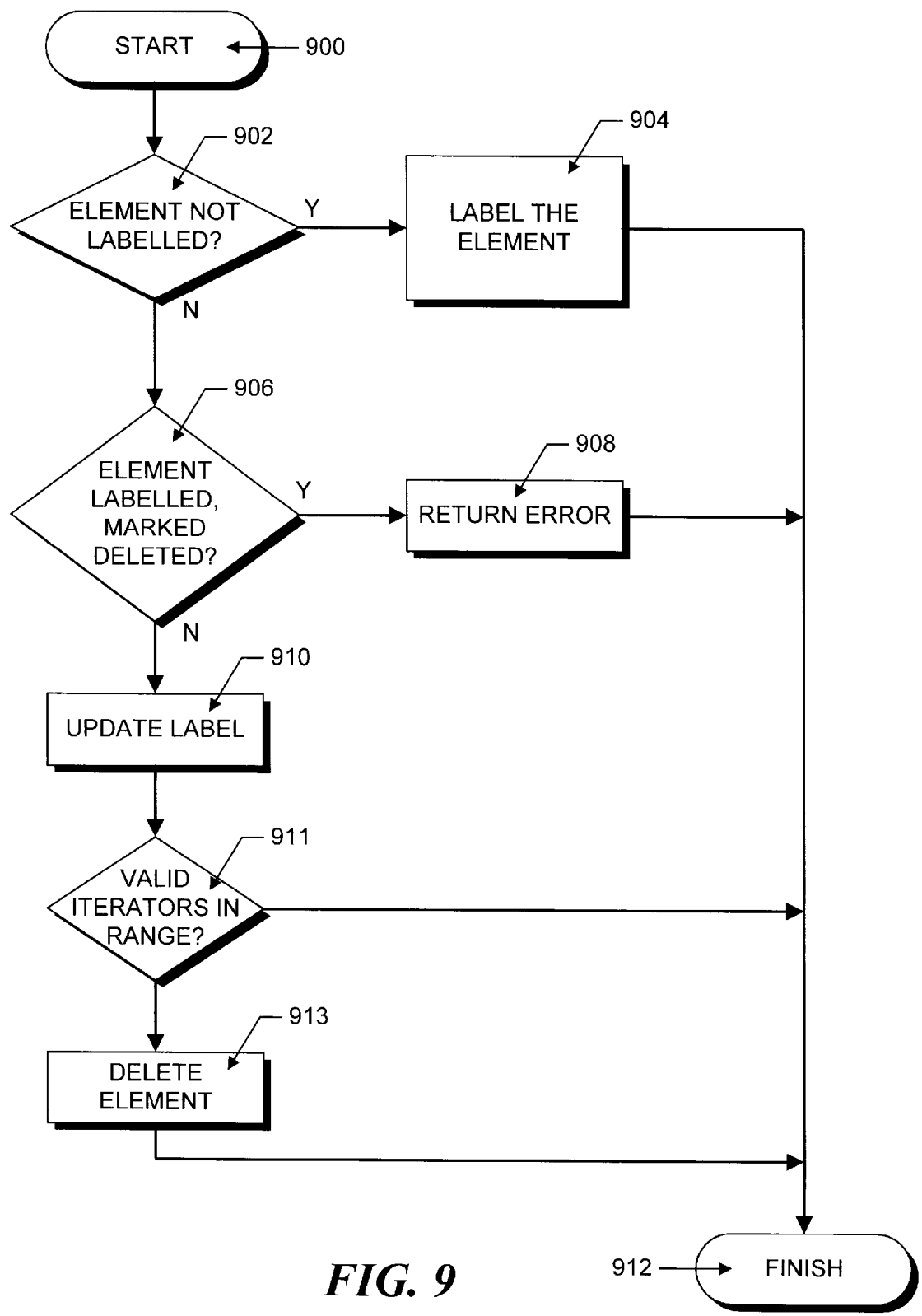
FIG. 9 is a flow diagram which illustrates the process of destroying an element in a collection of persistent objects in accordance with the principles of the present invention.

An element may be deleted in accordance with the principles of the invention as set forth in the flow diagram of FIG. 9. The element elimination process begins at step 900 and proceeds to step 902, where it is determined whether the element to be deleted is not labeled. If the element is not labeled, indicating that it was created before any iterators were created, the process proceeds to step 904, where the element is labeled. The label min ID field 434 is set to the current minimum valid iterator ID as determined by the value in variable 412, the label max ID field 436 is set to the current maximum valid iterator ID as determined by the value in variable 416, and the deleted flag 432 is set to be "True." Any iterator that examines this label will consider the element visible if its iterator ID falls within the range of the minimum 434 and maximum 436 iterator IDs in the label. From step 904, the process proceeds to step 912 where the process finishes.

If, in step 902, it is determined that the element is labeled, the process proceeds to step 906, where it is determined whether the element is labeled and marked deleted. If the element was labeled and marked deleted, an attempt is being made to mark deleted an element that is already marked deleted. Accordingly, the process proceeds to step 908, where an error is returned. From step 908, the process proceeds to finish at step 912.

If, in step 906, it is determined that the element was labeled but not marked deleted, the process proceeds to step 910, where the label is updated. In particular, the deleted flag 432 is set to "True". The minimum iterator ID value 434 is set equal to the next sequential iterator ID value after that stored within the maximum iterator ID variable 416, the maximum iterator ID value 416 is set equal to the maximum valid iterator ID 416 at the time the element is marked deleted. If the label is updated to an empty iterator set, the element and label can be deleted immediately. Therefore, the process proceeds from step 910 to step 911 where it is determined whether there are any valid iterators encompassed by the updated iterator ID range. If the range does encompass valid iterator IDs, the process proceeds to step 912, where it finishes. On the other hand, if the updated iterator ID range does not include any valid iterator IDs, the process proceeds from step 911 to step 913, where the element and label are deleted. From step 913, the process proceeds to finish in step 912.

Returning to the example set forth in the discussion related to FIG. 8, suppose element A is marked deleted before an additional iterator, for example iterator 5, has been launched. Element A's label will be updated to include 5,4, True as the values of the minimum iterator ID 434, maximum iterator ID 436 and deleted flag 432, respectively. Since the label's deleted flag 432 is set to "True", the range between the min ID 434 and the max ID 436 indicates the range of iterator IDs for which the element is visible. In this case, element A was created after iterators 1–4 were launched and marked deleted before iterator 5 was launched, the maximum iterator ID is less than the minimum iterator ID and the element will be correctly interpreted as invisible to all the iterators. Since this element label represents an empty valid iterator ID set, the element and label can be deleted immediately, as set forth in relation to steps 911 and 913 above. As another example, if element A was deleted after the launch of iterator 5, element A's label would be updated to include the respective values 5,5, "True". Iterators would find that element A, since it's deleted flag is "True, is visible to all iterators within the range 5,5. In the presently preferred embodiment, the range boundaries are inclusive and iterator 5 therefore falls within this range, so that element A's label would be correctly interpreted to mean that element A is visible to iterator 5 only.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, it would be clear to those skilled in the art that, although the invention has been described with respect to a distributed object system, it is applicable to create stable iterators in any multi-threaded system which has shared data collections. These, and other straightforward modifications to the inventive concept are intended to be covered by the appended claims.

What is claimed is:

1. Apparatus for making stable an iterator which is created to iterate over a collection of elements that is stored in a memory, said collection being shared by a plurality of threads which add such elements and mark such elements in the collection for deletion, the apparatus comprising:

a mechanism which associates a label with each element that is added to the collection after the iterator is created wherein the label indicates that the added element is not deleted and invisible to the iterator; and a mechanism for deleting one such element from the collection when the element is marked for deletion and the label for the marked element indicates that the marked element is invisible to the iterator.

2. Apparatus according to claim 1 wherein the label comprises a set of iterator identifiers (IDs) associated with the iterator to which the element is visible.

3. Apparatus according to claim 2 wherein the set of iterator IDs is associated with a range of iterators.

4. Apparatus according to claim 1 wherein the label comprises a flag which indicates whether the associated element is marked for deletion and is set by one such thread.

5. Apparatus according to claim 1 wherein the iterator only returns elements of the collection which are visible to the iterator.

6. Apparatus according to claim 1 wherein the apparatus makes stable a plurality of iterators which are created to iterate over the collection of elements and wherein a label association mechanism associates label with each element that is added to the collection after the plurality of iterators is created, wherein the label indicates the added element is not marked for deletion and invisible to the plurality of iterators.

7. Apparatus according to claim 1 wherein the apparatus makes stable a plurality of iterators which are created to iterate over the collection of elements wherein said iterators may be deleted and wherein the mechanism for deleting one such element from the collection deletes elements that are marked for deletion and for which the label for the marked element indicates that the marked element is visible to no iterator which has not been deleted.

8. Apparatus according to claim 1 further comprising an iterator deleting mechanism.

9. Apparatus according to claim 8 further comprising a list of all iterators created and a mechanism for indicating in the list which iterators have been deleted.

10. Apparatus according to claim 9 wherein said mechanism for deleting an iterator further comprises a mechanism for deleting all elements from the collection that are marked for deletion and for which the label for the marked element indicates that the marked element will be visible to no valid iterator after the iterator is destroyed.

11. Apparatus according to claim 1 wherein the apparatus makes stable a plurality of iterators which are created to iterate over the collection of elements and wherein the apparatus further comprises an iterator identifier which assigns a unique identifier to each of the plurality of iterators.

12. A stable iterator, comprising:

an iterator created to iterate over a collection of elements that is stored in memory, threads which share said collection of elements and add such elements to the collection and mark such elements in the collection for deletion, a mechanism which associates a label with each element that is added to the collection after the iterator is created wherein the label indicates that the added element is not deleted and invisible to the iterator; and a mechanism for deleting one such element from the collection when the element is marked for deletion and the label for the marked element indicates that the marked element is invisible to the iterator.

13. Apparatus for making stable a plurality of iterators which are created to iterate over a collection of objects in a multi-threaded distributed object system having a plurality of threads which add elements and mark elements for deletion, the apparatus comprising:

a mechanism which associates a label with each object that is added to the collection after a first of the plurality of iterators is created and before a second of the plurality of iterators is created, wherein the label indicates the added object is not deleted, is invisible to the first plurality of iterators and is visible to the second plurality of iterators; and a mechanism for deleting an object from the collection when the object is marked for deletion and the label for the marked object indicates that the marked object is invisible to all iterators which have not been deleted.

14. Apparatus of claim 13 wherein said multi-threaded distributed object system further comprises:

a marshaling mechanism encoding a persistent object attribute value into a marshal buffer; and an unmarshaling mechanism decoding the persistent object attribute value from the marshal buffer.

15. Apparatus of claim 14 wherein said distributed object system is a common object request broker architecture (CORBA) system and said marshaling and unmarshaling mechanisms conform to CORBA specifications.

16. A method for making stable an iterator which is created to iterate over a collection of elements that is stored in a memory and is shared by a plurality of threads which add such elements and mark such elements for deletion in the collection, the method comprising the steps of:

(a) creating a label associated with each element that is added to the collection after the iterator is created wherein the label indicates that the added element is not deleted and invisible to the iterator; and (b) deleting one such element from the collection when the element is marked for deletion and the label for the marked element indicates that the marked element is invisible to the iterator.

17. A method according to claim 16 wherein the label comprises a set of iterator identifiers (IDs) associated with the iterator to which the element is visible.

18. A method according to claim 17 wherein the set of iterator IDs is associated with a range of iterators.

19. A method according to claim 16 wherein the label comprises a flag which indicates whether the associated element is marked for deletion.

20. A method according to claim 17 wherein the iterator returns elements of the collection which are visible to the iterator.

21. A method according to claim 16 wherein the method makes stable a plurality of iterators which are created to iterate over the collection of elements and wherein a label is associated with each element that is added to the collection after the plurality of iterators is created, wherein the label indicates the added element is not marked for deletion and invisible to the plurality of iterators.

22. A method according to claim 16 wherein the method makes stable a plurality of iterators which are created to iterate over the collection of elements wherein said iterators may be deleted and wherein those elements are deleted from the collection that are marked for deletion and for which the label for the marked element indicates that the marked element is invisible to all iterators that have not been deleted.

23. A method according to claim 16 wherein a second iterator is created to iterate over the collection of elements and the method further comprises the step of:

(c) associating with all elements labels indicating that the elements are not marked for deletion and are visible to the second iterator.

24. A method according to claim 16 further comprising the step of:

(d) deleting an iterator.

25. A method according to claim 24 further comprising the step of:

(e) creating a list of all iterators created whereby said list indicates which iterators have been deleted and are no longer valid.

26. A method according to claim 25 further comprising the step of:

(f) deleting all elements from the collection that are marked for deletion and for which the label for the marked element indicates that the marked element will be visible to no valid iterator after the iterator is destroyed.

27. A method according to claim 16 whereby a plurality of iterators which are created to iterate over the collection of elements are made stable and an iterator identifier assigns a unique identifier to each of the plurality of iterators.

28. A method for making stable a plurality of iterators which are created to iterate over a collection of objects in a multi-threaded distributed object system having a plurality of threads which add such objects and mark such objects in the collection for deletion, the method comprising the steps of:

(a) creating a label associated with each object that is added to the collection after a first of the plurality of iterators is created and before a second of the plurality of iterators is created, wherein the label indicates the added object is not deleted, is invisible to the first iterator and is visible to the second iterator; and (b) deleting an object from the collection when the object is marked for deletion and a label for the marked object indicates that the marked object is invisible to any valid iterator in the plurality of iterators.

29. A method according to claim 28 wherein said distributed object system is a common object request broker architecture (CORBA) system and said method further comprises the steps of:

(c) encoding a persistent object attribute value into a marshal buffer according to CORBA specification to thereby provide an encoded persistent object attribute value; and (d) decoding the persistent object attribute value from the marshal buffer according to CORBA specifications to thereby provide a decoded persistent attribute value.

30. A computer program product for constructing a stable iterator to iterate over a collection of elements stored in a memory and shared by a plurality of threads which add such elements and mark such elements for deletion in the collection, the computer program product comprising a computer usable medium having computer readable program code thereon, including:

program code for constructing a mechanism which associates a label with each element that is added to the collection after the iterator is created wherein the label indicates that the added element is not deleted and invisible to the iterator; and program code for constructing a mechanism for deleting one such element from the collection when the element is marked for deletion and the label for the marked element indicates that the marked element is invisible to the iterator.

31. A computer program product according to claim 30 further comprising computer program code which constructs a list of all iterators created and a mechanism for indicating in the list which iterators have been deleted.

32. A computer program product according to 31 further comprising computer program code which constructs said mechanism for deleting an iterator such that said mechanism further comprises:

a mechanism for deleting all elements from the collection that are marked for deletion and for which the label for the marked element indicates that the marked element will be visible to no valid iterator after the iterator is destroyed.

33. A computer program product for making stable a plurality of iterators which are created to iterate over a collection of objects in a multi-threaded distributed object system having a plurality of threads which add elements and mark elements for deletion, the computer program product comprising a computer usable medium having computer readable program code written thereon, including:

computer program code for constructing a mechanism which associates a label with each object that is added to the collection after a first of the plurality of iterators is created and before a second of the plurality of iterators is created, wherein the label indicates the added object is not deleted, is invisible to the first iterator and is visible to the second iterator; and computer program code for constructing a mechanism for deleting an object from the collection when the object is marked for deletion and a label for the marked object indicates that the marked object is invisible to a valid iterator.

\* \* \* \* \*